United States Patent
Lemmer et al.

(10) Patent No.: US 9,975,529 B2
(45) Date of Patent: May 22, 2018

(54) PERFORMANCE ELECTRIC PARKING BRAKE CONTROLLERS

(71) Applicant: Ford Global Technologies, LLC, Dearborn, MI (US)

(72) Inventors: Brian Marvin Lemmer, Dearborn, MI (US); Curtis Hargitt, Howell, MI (US); Greg David Folta, Ann Arbor, MI (US); Chad Michael Korte, Gross Ile, MI (US); Scott Mlynarczyk, South Lyon, MI (US); Alexander Ferencz, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 52 days.

(21) Appl. No.: 15/231,964

(22) Filed: Aug. 9, 2016

(65) Prior Publication Data
US 2018/0043867 A1    Feb. 15, 2018

(51) Int. Cl.
| | |
|---|---|
| B60T 13/74 | (2006.01) |
| B60T 7/10 | (2006.01) |
| F16D 65/18 | (2006.01) |
| F16D 121/04 | (2012.01) |
| F16D 121/24 | (2012.01) |

(52) U.S. Cl.
CPC .............. *B60T 7/102* (2013.01); *F16D 65/18* (2013.01); *F16D 2121/04* (2013.01); *F16D 2121/24* (2013.01)

(58) Field of Classification Search
CPC ... B60T 7/04; B60T 7/12; B60T 7/042; B60T 7/085; B60T 13/145; B60T 13/662; B60T 13/741

USPC .......... 303/3, 7, 15, 20, 156–164; 701/70–72
See application file for complete search history.

(56) References Cited

U.S. PATENT DOCUMENTS

| | | | |
|---|---|---|---|
| 5,489,246 A | | 2/1996 | Moody et al. |
| 6,019,436 A | * | 2/2000 | Siepker ................... B60T 7/12 188/106 F |
| 6,092,877 A | * | 7/2000 | Rasidescu ............... B60T 8/261 188/345 |
| 6,273,523 B1 | * | 8/2001 | Wakabayashi .......... B60T 8/261 188/349 |
| 6,505,894 B2 | * | 1/2003 | Dunning ............... B60T 8/1766 303/186 |

(Continued)

FOREIGN PATENT DOCUMENTS

| | | |
|---|---|---|
| EP | 0978432 | 2/2000 |
| EP | 1179462 | 10/2007 |

(Continued)

*Primary Examiner* — Christopher P Schwartz
(74) *Attorney, Agent, or Firm* — Frank MacKenzie; Hanley, Flight & Zimmerman, LLC

(57) ABSTRACT

Performance electric parking brake controllers determine braking control signals for a performance electric parking brake system of a vehicle based on differing sets of operating conditions of the vehicle. A controller is configured to electromechanically actuate rear brake calipers of the vehicle in response to a first set of operating conditions of the vehicle, to hydraulically actuate front brake calipers and the rear brake calipers of the vehicle in response to a second set of operating conditions of the vehicle, and to hydraulically actuate only the rear brake calipers in response to a third set of operating conditions of the vehicle.

18 Claims, 7 Drawing Sheets

(56) References Cited

U.S. PATENT DOCUMENTS

| | | |
|---|---|---|
| 6,513,632 B2 | 2/2003 | Peter |
| 6,648,107 B2 | 11/2003 | Lundholm et al. |
| 6,793,295 B2 * | 9/2004 | Sakamoto ............. B60T 8/1706 303/9.61 |
| 7,178,881 B2 * | 2/2007 | Check .................... B60T 8/172 303/191 |
| 7,731,627 B2 | 6/2010 | Shimizu et al. |
| 8,768,592 B2 * | 7/2014 | Kornhaas .............. B60T 8/1766 701/70 |
| 9,242,624 B2 | 1/2016 | Huennekens et al. |
| 9,744,950 B1 * | 8/2017 | Lemmer ................. B60T 7/085 |
| 2006/0197374 A1 * | 9/2006 | Jez .......................... B60T 7/085 303/20 |
| 2011/0037310 A1 * | 2/2011 | Knechtges ............ B60T 8/1766 303/9.62 |

FOREIGN PATENT DOCUMENTS

| | | |
|---|---|---|
| EP | 1179463 | 10/2007 |
| EP | 2483113 | 8/2015 |

* cited by examiner

PERFORMANCE ELECTRIC PARKING BRAKE CONTROLLERS

FIELD OF THE DISCLOSURE

This disclosure relates generally to parking brake controllers and, more particularly, to performance electric parking brake controllers.

BACKGROUND

Conventional mechanical parking brake systems are configured such that, when the driver activates (e.g., pulls upward on) a parking brake lever coupled via a cable to the rear brakes of the vehicle, a braking force is applied to the rear wheels via the rear brakes. In such conventional mechanical parking brake systems, the amount, degree and/or extent of the applied braking force is based on the position at which the parking brake lever is held by the driver.

Conventional electric parking brake systems are configured such that, when the driver activates (e.g., pulls upward on) a parking brake switch while driving, the vehicle is steadily slowed and/or brought to a controlled stop using the hydraulic control unit of the vehicle to provide hydraulic pressure to all four wheels of the vehicle. Such electric parking brake systems fail to include characteristics and/or capabilities that enable the system to perform in a manner that mimics the performance of a conventional mechanical parking brake system.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Unlike conventional electric parking brake systems, the PEPB controllers and/or PEPB systems disclosed herein advantageously provide performance-based driving characteristics traditionally associated with mechanical parking brake systems. For example, the disclosed PEPB controllers and/or PEPB systems advantageously provide for a driver of a vehicle who selects a performance-based driving mode for the vehicle to control the application of variable braking forces to the rear wheels of the vehicle via a driver-positionable parking brake lever in communication with the PEPB controller of the PEPB system.

Figure 1:
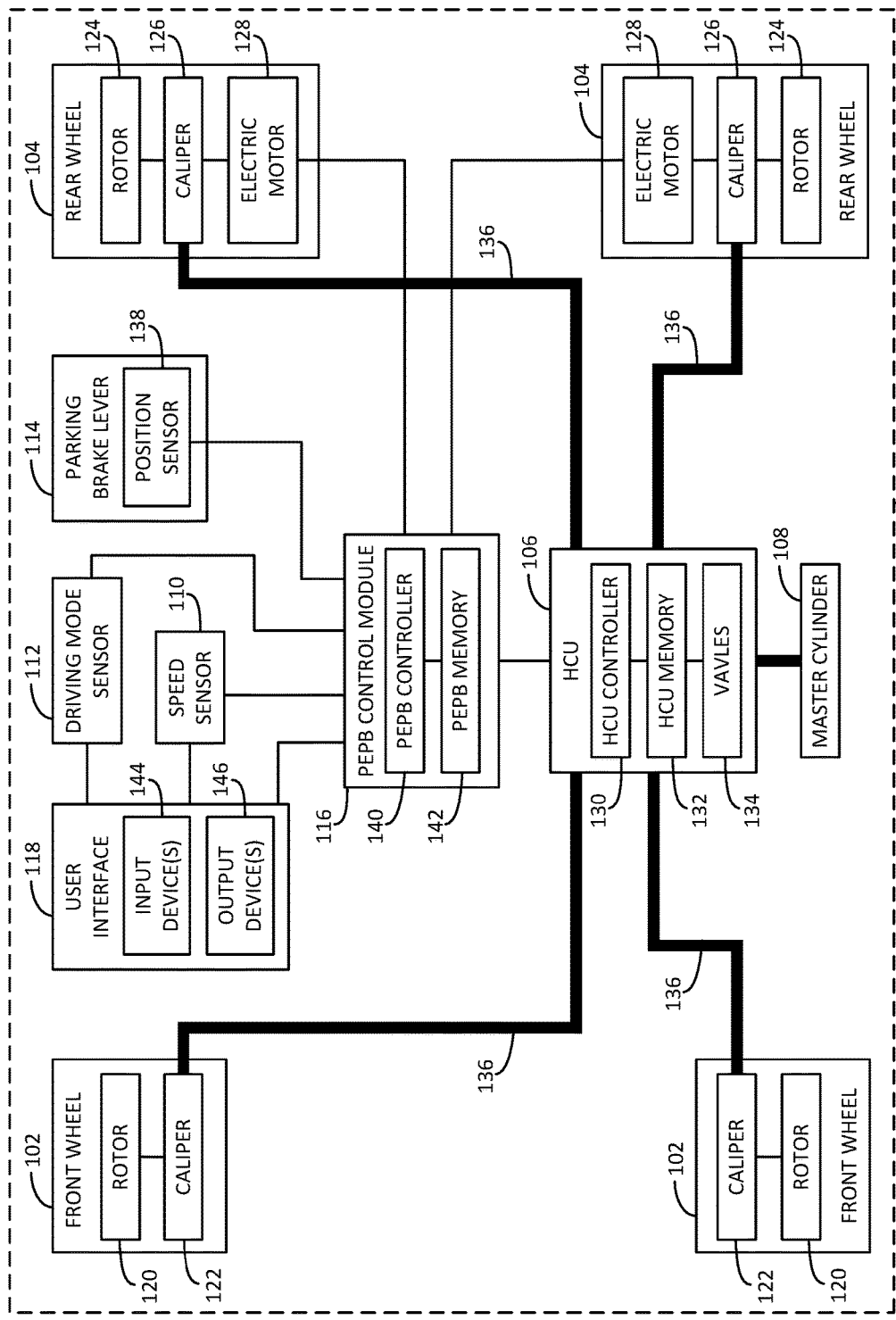
FIG. 1 is a block diagram of an example performance electric parking brake (PEPB) system constructed in accordance with the teachings of this disclosure.
Figure 2:
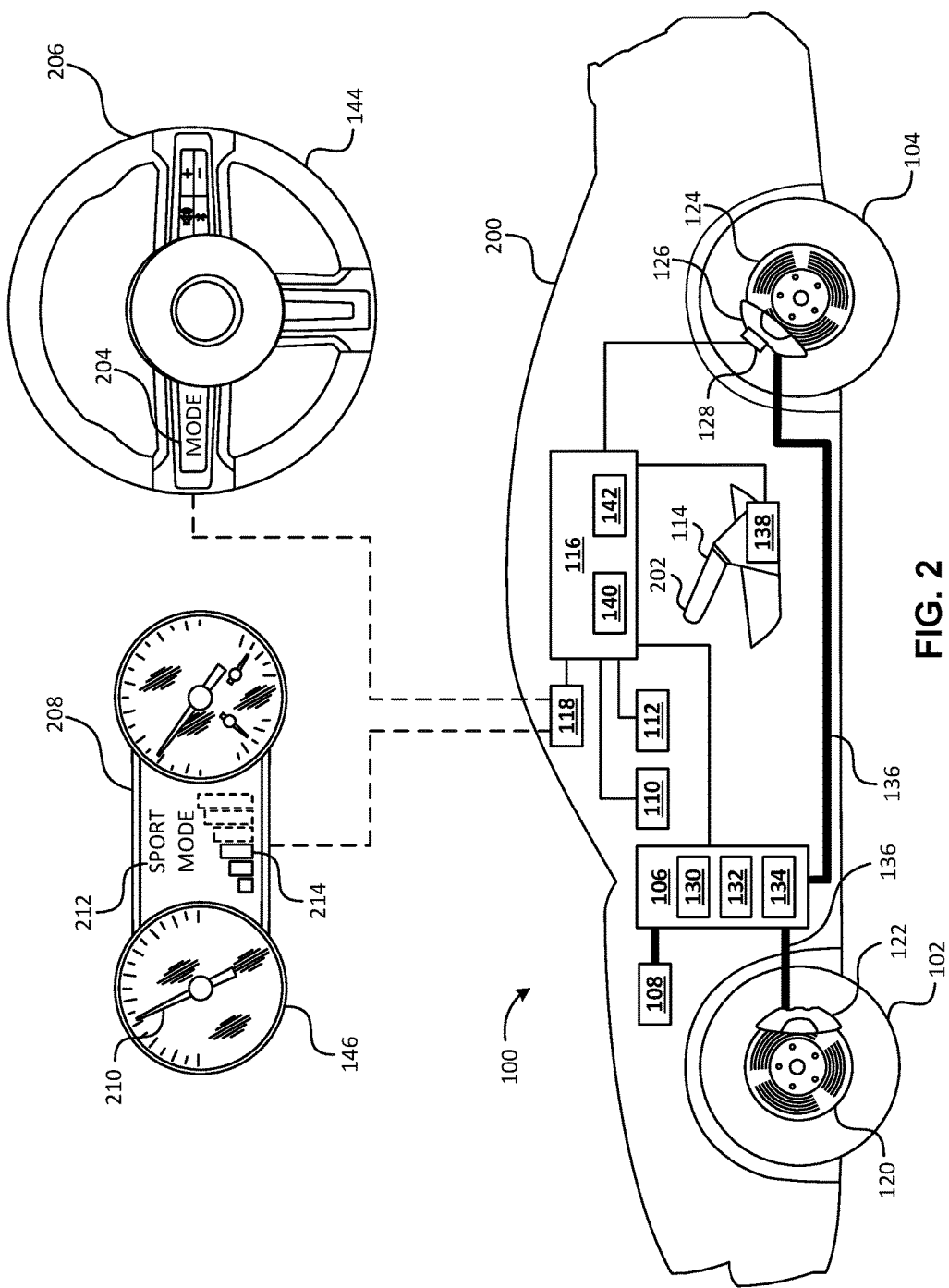
FIG. 2 illustrates the example PEPB system of FIG. 1 implemented in an example vehicle.

FIG. 1 is a block diagram of an example PEPB system 100 constructed in accordance with the teachings of this disclosure. FIG. 2 illustrates the example PEPB system 100 of FIG. 1 implemented in an example vehicle 200. In the illustrated examples of FIGS. 1 and 2, the PEPB system 100, and/or, more generally, the vehicle 200 includes example front wheels 102, example rear wheels 104, an example hydraulic control unit (HCU) 106, an example master cylinder 108, an example speed sensor 110, an example driving mode sensor 112, an example parking brake lever 114, an example PEPB control module 116, and an example user interface 118. However, other example implementations of the PEPB system 100 may include fewer or additional structures in accordance with the teachings of this disclosure. The front wheels 102, rear wheels 104, HCU 106, master cylinder 108, speed sensor 110, driving mode sensor 112, parking brake lever 114, PEPB control module 116, and user interface 118 of the PEPB system 100 of FIGS. 1 and 2 may be of any size(s), shape(s) and/or configuration(s) that enable(s) the PEPB system 100 to be implemented in and/or on a vehicle such as the example vehicle 200 of FIG. 2.

The example front wheels 102 of FIGS. 1 and 2 are respectively coupled (either directly or indirectly) to a body and/or subframe of a vehicle (e.g., the vehicle 200 of FIG. 2) via one or more shafts, rods and/or axles (not shown) thereof. The front wheels 102 may be of any size, shape and/or configuration. The PEPB system 100 of FIGS. 1 and 2, and/or, more generally, the vehicle 200 of FIG. 2 may include any number of front wheels 102, including a single front wheel.

Respective ones of the front wheels 102 of FIGS. 1 and 2 include corresponding ones of example front wheel rotors 120 and corresponding ones of example front wheel brake calipers 122. The speed at which the front wheel rotors 120, and/or, more generally, the front wheels 102 rotate may be restricted and/or reduced by the application of braking forces to the front wheel rotors 120 via the front wheel brake calipers 122. For example, the front wheel brake calipers 122 may be hydraulically actuated via the HCU 106 of FIGS. 1 and 2 to cause brake pads (not shown) of the front wheel brake calipers 122 to press against the front wheel rotors 120 of the front wheels 102. This results in a slowing (e.g., deceleration) and/or stopping of the rotation of the front wheel rotors 120, and/or, more generally, the front wheels 102. As described below, the degree and/or extent to which the front wheel brake calipers 122 are hydraulically actuated is dependent upon a pressure of a hydraulic fluid delivered to the front wheel brake calipers 122 via the HCU 106, which in turn is dependent upon one or more braking control signal(s) provided to the HCU 106 via the PEPB control module 116. As used herein, the term "hydraulically actuate" refers to an actuation process by which an electronic signal (e.g., a braking control signal provided by the PEPB control module 116) generates and/or is converted into a corresponding pressure of a pressurized hydraulic fluid, whereby the pressurized hydraulic fluid causes mechanical movement of a target structure (e.g., a brake caliper) to which the pressurized hydraulic fluid is supplied.

The example rear wheels 104 of FIGS. 1 and 2 are respectively coupled (either directly or indirectly) to a body and/or subframe of a vehicle (e.g., the vehicle 200 of FIG.

2) via one or more shafts, rods and/or axes (not shown) thereof. The rear wheels 104 may be of any size, shape and/or configuration. The PEPB system 100 of FIGS. 1 and 2, and/or, more generally, the vehicle 200 of FIG. 2 may include any number of rear wheels 104, including a single rear wheel.

Respective ones of the rear wheels 104 of FIGS. 1 and 2 include corresponding ones of example rear wheel rotors 124, corresponding ones of example rear wheel brake calipers 126, and corresponding ones of rear wheel brake caliper electric motors 128. The speed at which the rear wheel rotors 124, and/or, more generally, the rear wheels 104 rotate may be restricted and/or reduced by the application of braking forces to the rear wheel rotors 124 via the rear wheel brake calipers 126. For example, the rear wheel brake calipers 126 may be hydraulically actuated via the HCU 106 of FIGS. 1 and 2 to cause brake pads (not shown) of the rear wheel brake calipers 126 to press against the rear wheel rotors 124 of the rear wheels 104. This results in a slowing (e.g., deceleration) and/or stopping of the rotation of the rear wheel rotors 124, and/or, more generally, the rear wheels 104. As described below, the degree and/or extent to which the rear wheel brake calipers 126 are hydraulically actuated is dependent upon a pressure of a hydraulic fluid delivered to the rear wheel brake calipers 126 via the HCU 106, which in turn is dependent upon one or more braking control signal(s) provided to the HCU 106 via the PEPB control module 116.

In some examples, the rear wheel brake calipers 126 may additionally and/or alternatively be electromechanically actuated via the rear wheel brake caliper electric motors 128 of FIGS. 1 and 2 to cause the brake pads of the rear wheel brake calipers 126 to press against the rear wheel rotors 124 of the rear wheels 104. This may result in application of a clamping force to the rear wheel rotors 124, and/or, more generally, the rear wheels 104. In some examples, the applied clamping force may be of sufficient strength to effectively lock the rear wheel rotors 124, and/or, more generally, the rear wheels 104 in place such that the rear wheel rotors 124 and/or the rear wheels 104 are unable to rotate until the clamping force is released and/or relieved. As described below, the degree and/or extent to which the rear wheel brake calipers 126 are electromechanically actuated is dependent upon one or more braking control signal(s) provided to the rear wheel brake caliper electric motors 128 via the PEPB control module 116. As used herein, the term "electromechanically actuate" refers to an actuation process by which an electronic signal (e.g., a braking control signal provided by the PEPB control module 116) generates and/or is converted into a corresponding force exerted by a solid (e.g., non-fluid) structure, whereby the force causes mechanical movement of a target structure (e.g., a brake caliper) to which the force is applied. Thus, the term "electromechanically actuate" does not encompass the term "hydraulically actuate."

The example HCU 106 of FIGS. 1 and 2 manages and/or controls the supply of hydraulic fluid to the front wheel brake calipers 122 of the front wheels 102 and to the rear wheel brake calipers 126 of the rear wheels 104. Hydraulic fluid to be supplied by the HCU 106 to the front wheel brake calipers 122 and/or the rear wheel brake calipers 126 is supplied to the HCU 106 via the master cylinder 108. In some examples, one or more hydraulic pump(s) (not shown) may assist in pressurizing and/or supplying hydraulic fluid from the master cylinder 108 to the HCU 106, and or from the HCU 106 to the front wheel brake calipers 122 and/or the rear wheel brake calipers 126. In the illustrated examples of FIGS. 1 and 2, the HCU 106 includes an example HCU controller 130, an example HCU memory 132, and example valves 134.

The HCU controller 130 of FIGS. 1 and 2 may be implemented by a semiconductor device such as a microprocessor, controller or microcontroller. Based on one or more braking control signal(s) received by the HCU controller 130, and/or, more generally, by the HCU 106 from the PEPB control module 116, the HCU controller 130 actuates one or more valve(s) 134 of the HCU 106 to cause a controlled pressure of hydraulic fluid to be provided to corresponding ones of the front wheel brake calipers 122 and/or to corresponding ones of the rear wheel brake calipers 126, as indicated by the braking control signal(s). In response to the actuation of the one or more valve(s) 134, the determined pressure of hydraulic fluid is delivered to the front wheel brake calipers 122 and/or rear wheel brake calipers 126 via one or more corresponding hydraulic fluid supply line(s) 136.

For example, the HCU controller 130 may obtain (either directly from the PEPB control module 116, or by accessing the HCU memory 132) a braking control signal indicating that seventy percent (70%) of the maximum available hydraulic pressure associated with the hydraulic fluid should be provided via corresponding ones of hydraulic fluid supply lines 136 to the front wheel brake calipers 122 and to the rear wheel brake calipers 126. In response to such a braking control signal, the HCU controller 130 actuates one or more of the valve(s) 134 to cause the hydraulic fluid to be provided, via the corresponding ones of the hydraulic fluid supply lines 136, to the front wheel brake calipers 122 and to the rear wheel brake calipers 126 at a pressure corresponding to the instruction provided by the braking control signal.

As another example, the HCU controller 130 may obtain (either directly from the PEPB control module 116, or by accessing the HCU memory 132) a braking control signal indicating that fifteen percent (15%) of the maximum available hydraulic pressure associated with the hydraulic fluid should be provided via corresponding ones of the hydraulic fluid supply lines 136 to the rear wheel brake calipers 126 only. In response to such a braking control signal, the HCU controller 130 actuates one or more of the valve(s) 134 to cause the hydraulic fluid to be provided, via the corresponding ones of the hydraulic fluid supply lines 136, to the rear wheel brake calipers 126 at a pressure corresponding to the instruction provided by the braking control signal.

The HCU memory 132 of FIGS. 1 and 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the HCU memory 132 may be stored in any file and/or data structure format, organization scheme, and/or arrangement. Braking control signals received by the HCU controller 130, and/or, more generally, by the HCU 106 may be stored in the HCU memory 132. The HCU memory 132 is accessible to the HCU controller 130 of FIGS. 1 and 2, and/or, more generally, to the HCU 106 of FIGS. 1 and 2.

The valves 134 of the HCU 106 of FIGS. 1 and 2 may be implemented as electromechanically operated solenoid valves. The valves 134 function as switches controllable via the HCU controller 130 of the HCU 106 to turn on, turn off, and/or otherwise distribute a flow of hydraulic fluid to corresponding ones of the front wheel brake calipers 122 of the front wheels 102 and/or corresponding ones of the rear wheel brake calipers 126 of the rear wheels 104.

The example speed sensor 110 of FIGS. 1 and 2 senses, measures and/or detects a speed at which one or more of the front wheels 102 and/or rear wheels 104 of a vehicle (e.g., the vehicle 200 of FIG. 2) is/are rotating. The speed sensor 110 correlates and translates the sensed, measured and/or detected speed of rotation of the one or more of the front wheels 102 and/or rear wheels 104 into a vehicle speed corresponding to the speed at which the vehicle 200 is traveling. The PEPB system 100 may include any number of speed sensors 110, including a single speed sensor. In some examples, the speed sensor 110 may be implemented as a vehicle speed sensor (VSS) coupled to the transmission and/or transaxle (not shown) of the vehicle 200. In other examples, the speed sensor 110 may be implemented as one or more wheel speed sensors (WSS) coupled to corresponding ones of the front wheels 102 and/or or rear wheels 104 of the vehicle 200. In the illustrated examples of FIGS. 1 and 2, the vehicle speed sensed, measured and/or detected by the speed sensor 110 is provided to and/or made accessible to the PEPB control module 116.

The example driving mode sensor 112 of FIGS. 1 and 2 senses and/or detects a selectable driving mode of a vehicle (e.g., the vehicle 200 of FIG. 2). For example, the driving mode sensor 112 may detect that the vehicle 200 has been set to one of a normal driving mode, a comfort driving mode, an economy driving mode, a sport driving mode or a track driving mode. In some examples, the driving mode sensor 112 senses and/or detects the driving mode of the vehicle based on one or more signal(s) and/or command(s) generated by the user interface 118 of the PEPB system 100 in response to one or more user input(s) to the user interface 118. In the illustrated examples of FIGS. 1 and 2, the vehicle driving mode sensed, measured and/or detected by the driving mode sensor 112 is provided to and/or made accessible to the PEPB control module 116.

The example parking brake lever 114 of FIGS. 1 and 2 is mounted within a vehicle (e.g., the vehicle 200 of FIG. 2) and is movable over a range of positions. In some examples, the parking brake lever 114 is pivotally coupled at a fixed end (not shown) to a frame and/or body (not shown) of the vehicle 200 such that a free end 202 of the parking brake lever 114 is rotatable about a pivot point (not shown) of the fixed end. In some examples, the parking brake lever 114 is mechanically biased (e.g., by a spring) to a neutral position. In such examples, the parking brake lever 114 will remain at and/or return to the neutral position in the absence of an application of force (e.g., pushing or pulling) to the free end 202 of the parking brake lever 114 by a user (e.g., a driver) positioned within the vehicle 200.

The parking brake lever 114 of FIGS. 1 and 2 includes an example position sensor 138 that senses, measures and/or detects a position (e.g., an angular position and/or angular displacement) of the parking brake lever 114. For example, the position sensor 138 may sense, measure and/or detect that the parking brake lever 114 is in the neutral position, in one or more position(s) deviating upward from the neutral position (e.g., a brake activation position), or in one or more position(s) deviating downward from the neutral position (e.g., a brake release position). In the illustrated examples of FIGS. 1 and 2, the position of the parking brake lever 114 sensed, measured and/or detected by the position sensor 138 is provided to and/or made accessible to the PEPB control module 116.

Figure 3:
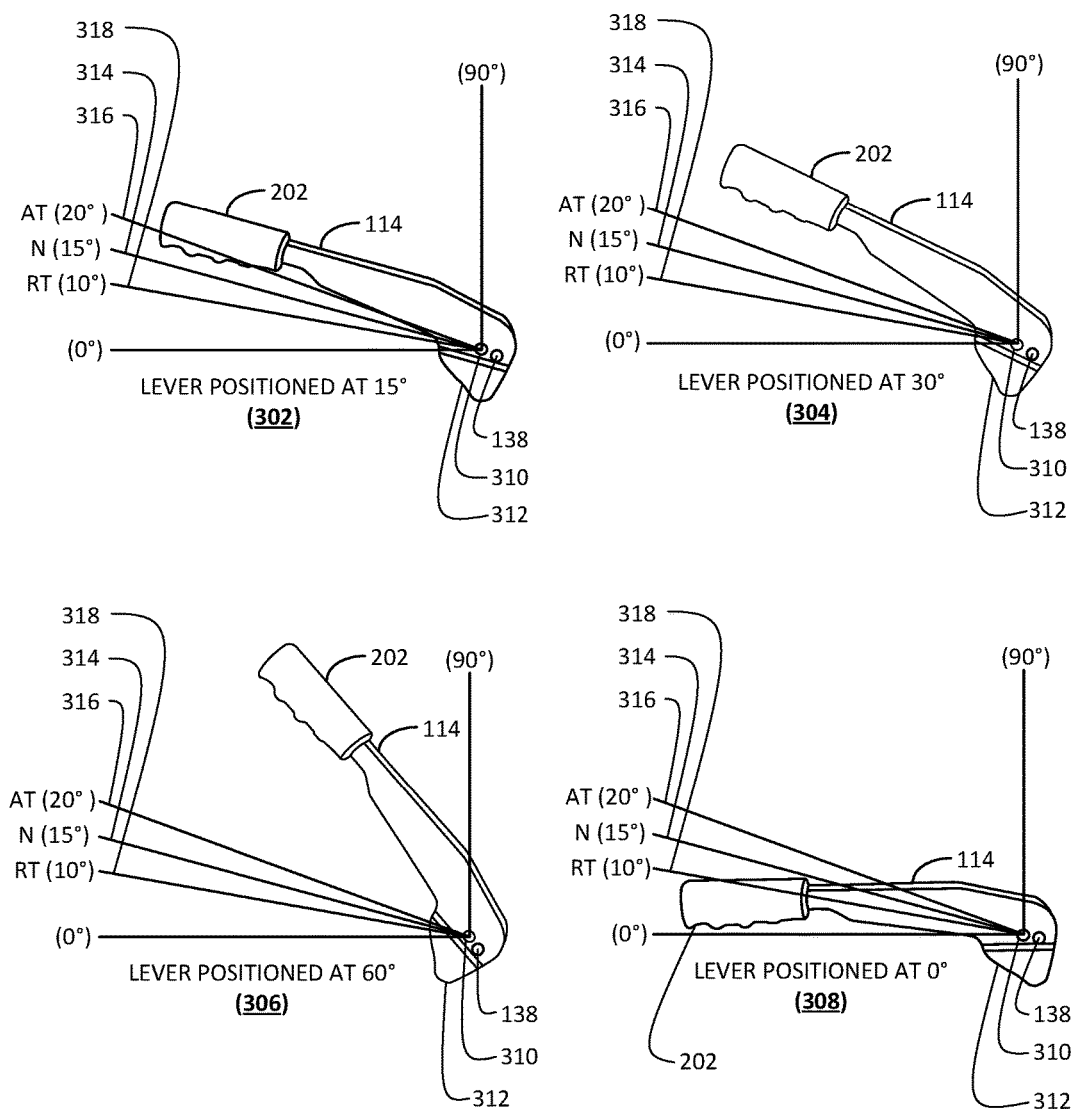
FIG. 3 illustrates the example parking brake lever of FIGS. 1 and 2 positioned in respective ones of first, second, third and fourth example positions.

FIG. 3 illustrates the parking brake lever 114 of FIGS. 1 and 2 positioned in respective ones of a first example position 302, a second example position 304, a third example position 306 and a fourth example position 308. In the illustrated example of FIG. 3, the free end 202 of the parking brake lever 114 is rotatable between a range of zero degrees (0°) and seventy-five degrees (75°) about an example pivot point 310 to which an example fixed end 312 of the parking brake lever 114 is pivotally coupled. In other examples, the free end 202 of the parking brake lever 114 may be rotatable between a range that is narrower than, broader than, and/or shifted relative to the range described in the example of FIG. 3. In the example of FIG. 3, the first example position 302 illustrates the parking brake lever 114 positioned at an angle of approximately fifteen degrees (15°). The second example position 304 illustrates the parking brake lever 114 positioned at an angle of approximately thirty degrees (30°). The third example position 306 illustrates the parking brake lever 114 positioned at an angle of approximately sixty degrees (60°). The fourth example position 308 illustrates the parking brake lever 114 positioned at an angle of approximately zero degrees (0°). The position sensor 138 of the parking brake lever 114 senses, measures and/or detects respective ones of the first, second, third and fourth example positions 302, 304, 306, 308 of the parking brake lever 114 and provides data corresponding to the detected first, second, third and fourth example positions 302, 304, 306, 308 to the PEPB control module 116.

FIG. 3 further illustrates, in a superimposed manner relative to the illustrated parking brake lever 114, angular indications corresponding respectively to an example neutral position (N) 314 associated with the parking brake lever 114, an example activation position threshold (AT) 316 associated with the parking brake lever 114, and an example release position threshold (RT) 318 associated with the parking brake lever 114. In the illustrated example of FIG. 3, the neutral position 314 lies at an angle of approximately fifteen degrees (15°) and is indicative of the position to which the parking brake lever 114 is biased in the absence of an application of force (e.g., pushing or pulling) to the free end 202 of the parking brake lever 114 by a user. For example, if a user moves the parking brake lever 114 from the first example position 302 (e.g., fifteen degrees (15°)) to the second example position 304 (e.g., thirty degrees (30°)) and subsequently releases the parking brake lever 114, the parking brake lever 114 will automatically return to the first example position 302 (e.g., fifteen degrees (15°)) as a result of the biasing forces acting on the parking brake lever 114.

In the illustrated example of FIG. 3, the activation position threshold 316 lies at an angle of approximately twenty degrees (20°) and is indicative of a minimal angular position in a first direction relative to the neutral position 314 to which the parking brake lever 114 must be displaced and/or rotated to cause the PEPB control module 116 to generate one or more braking control signal(s) associated with actuating one or more of the front wheel brake calipers 122 and/or rear wheel brake calipers 126. The release position threshold 318 lies at an angle of approximately ten degrees (10°) and is indicative of a minimal angular position in a second direction relative to the neutral position 314 opposite the first direction to which the parking brake lever 114 must be displaced and/or rotated to cause the PEPB control module 116 to generate one or more braking control signal(s) associated with releasing one or more of the front wheel brake calipers 122 and/or rear wheel brake calipers 126. Accordingly, the neutral position 314 to which the parking brake lever 114 is biased satisfies neither the activation position threshold 316 nor the release position threshold 318.

In other examples, one or more of the neutral position 314, the activation position threshold 316 and/or the release position threshold 318 of the parking brake lever 114 may lie at an angle that differs from that illustrated in the example of FIG. 3. As further described below, the respective angular positions of the parking brake lever 114 corresponding to the neutral position 314, the activation position threshold 316 and/or the release position threshold 318 may be stored by the PEPB control module 116 of FIGS. 1 and 2.

Returning to the examples of FIGS. 1 and 2, the example PEPB control module 116 includes an example PEPB controller 140 and an example PEPB memory 142. The PEPB controller 140 of FIGS. 1 and 2 may be implemented by a semiconductor device such as a microprocessor, controller or microcontroller. The PEPB controller 140, and/or, more generally, the PEPB control module 116 manages and/or controls the operation of the HCU 106 and the rear wheel brake caliper electric motors 128 of the PEPB system 100 based on data and/or information received, obtained and/or accessed by the PEPB controller 140 and/or the PEPB control module 116 from one or more of the speed sensor 110, the driving mode sensor 112, the user interface 118 and/or the position sensor 138.

The PEPB controller 140 of FIGS. 1 and 2 determines and/or identifies a speed of a vehicle (e.g., the vehicle 200 of FIG. 2) based on data and/or information sensed, measured and/or detected by the speed sensor 110. For example, the PEPB controller 140 may determine that the speed of the vehicle 200 is thirty miles per hour (30 mph) based on data and/or information sensed, measured and/or detected by the speed sensor 110. The PEPB controller 140 compares the determined and/or identified vehicle speed to a speed threshold to determine whether the vehicle speed satisfies (e.g., exceeds) the speed threshold. For example, the PEPB controller 140 may determine that the example vehicle speed of thirty miles per hour (30 mph) described above satisfies an example speed threshold of one mile per hour (1 mph) and above. The speed threshold may be stored in a computer-readable storage medium storing electronically readable data accessible to the PEPB controller 140 such as the PEPB memory 142 described below.

The PEPB controller 140 of FIGS. 1 and 2 determines and/or identifies a driving mode of a vehicle (e.g., the vehicle 200 of FIG. 2) based on data and/or information sensed, measured and/or detected by the driving mode sensor 112. For example, the PEPB controller 140 may determine that the driving mode of the vehicle 200 is a sport mode based on data and/or information sensed, measured and/or detected by the driving mode sensor 112. The PEPB controller 140 determines whether the determined and/or identified vehicle driving mode is a performance mode. For example, the PEPB controller 140 may recognize the determined and/or identified driving mode (e.g., the sport mode) as associated with and/or indicative of a performance driving mode based on a driving mode correlation table, list and/or matrix. The driving mode correlation table, list and/or matrix utilized by the PEPB controller 140 may be of any format and may include any number of factors and/or fields. The driving mode correlation table, list and/or matrix may be stored in a computer-readable storage medium storing electronically readable data accessible to the PEPB controller 140 such as the PEPB memory 142 described below.

Figure 4:
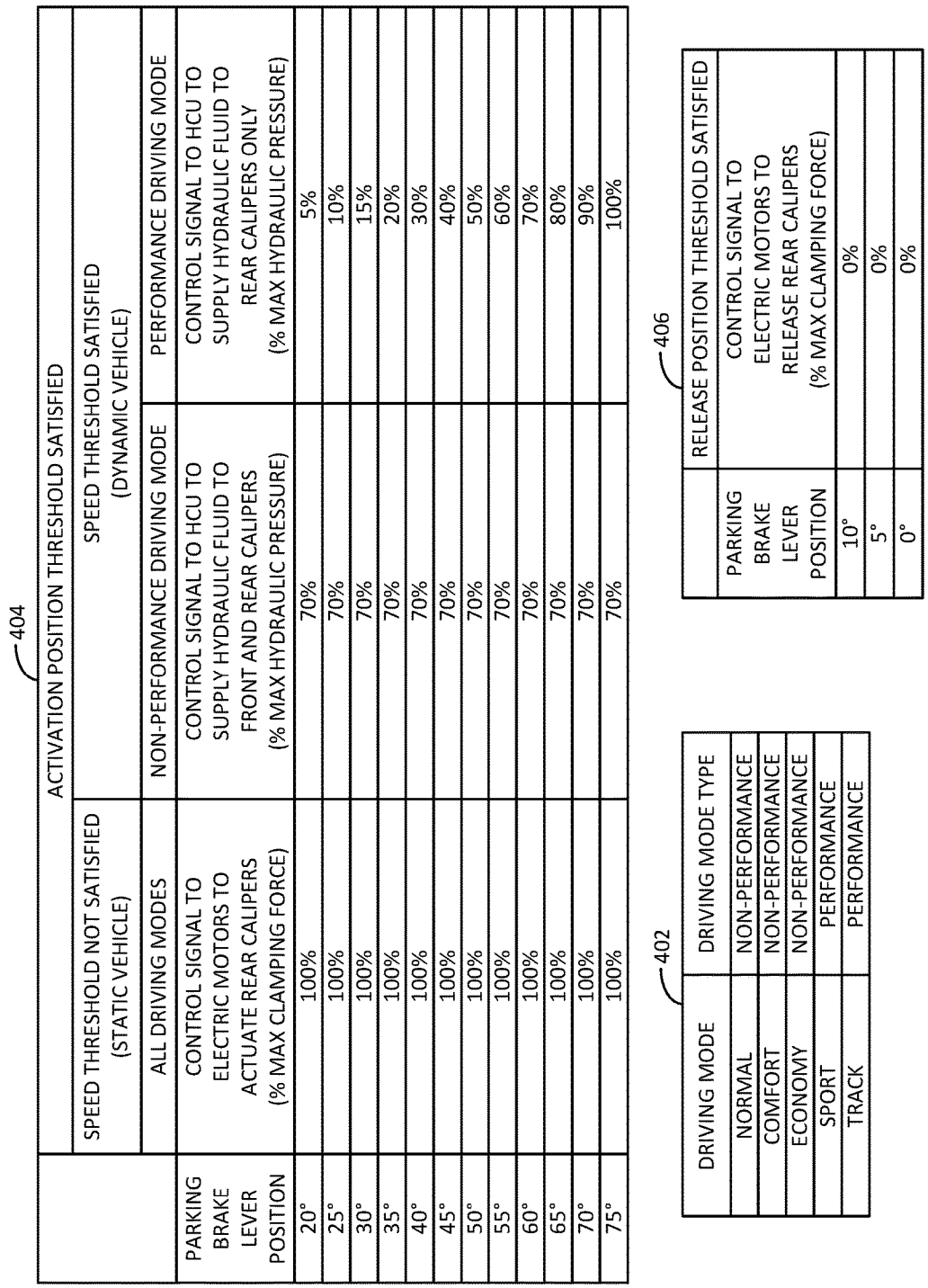
FIG. 4 illustrates an example driving mode correlation table, an example activation position correlation table, and an example release position correlation table utilized by the example PEPB controller of FIGS. 1 and 2.

FIG. 4 illustrates an example driving mode correlation table 402 utilized by the example PEPB controller 140 of FIGS. 1 and 2. In the illustrated example of FIG. 4, the driving mode correlation table 402 associates and/or identifies respective ones of vehicle driving modes (e.g., a normal mode, a comfort mode, an economy mode, a sport mode, and a track mode) as being either a performance mode or a non-performance mode. For example, the driving mode correlation table 402 associates and/or identifies the normal, comfort and/or economy modes as non-performance modes, and associates and/or identifies the sport and/or track modes as performance modes. In this example, if the PEPB controller 140 determines and/or identifies that the driving mode of the vehicle 200 is the sport mode, the PEPB controller 140 accordingly determines, based on the driving mode correlation table 402, that the driving mode of the vehicle 200 is a performance mode.

Returning to the examples of FIGS. 1 and 2, the PEPB controller 140 of FIGS. 1 and 2 determines and/or identifies a position of the parking brake lever 114 of a vehicle (e.g., the vehicle 200 of FIG. 2) based on data and/or information sensed, measured and/or detected by the position sensor 138. For example, the PEPB controller 140 may determine based on data and/or information sensed, measured and/or detected by the position sensor 138 that the parking brake lever 114 is in a position corresponding to the second example position 304 (e.g., thirty degrees (30°)) illustrated in FIG. 3. The PEPB controller 140 compares the determined and/or identified parking brake lever position to an activation position threshold to determine whether the parking brake lever position satisfies (e.g., exceeds) the activation position threshold. For example, the PEPB controller 140 may determine that the second example position 304 (e.g., thirty degrees (30°)) of the parking brake lever 114 satisfies the activation position threshold 316 (e.g., twenty degrees (20°) or greater) illustrated in FIG. 3. The activation position threshold may be stored in a computer-readable storage medium storing electronically readable data accessible to the PEPB controller 140 such as the PEPB memory 142 described below.

As another example, the PEPB controller 140 may determine based on data and/or information sensed, measured and/or detected by the position sensor 138 that the parking brake lever 114 is in a position corresponding to the fourth example position 308 (e.g., zero degrees (0°)) illustrated in FIG. 3. The PEPB controller 140 compares the determined and/or identified parking brake lever position to a release position threshold to determine whether the parking brake lever position satisfies (e.g., is less than) the release position threshold. For example, the PEPB controller 140 may determine that the fourth example position 308 (e.g., zero degrees (0°)) of the parking brake lever 114 satisfies the release position threshold 318 (e.g., ten degrees (10°) or less) illustrated in FIG. 3. The release position threshold may be stored in a computer-readable storage medium storing electronically readable data accessible to the PEPB controller 140 such as the PEPB memory 142 described below.

Based on the determinations as to whether the vehicle speed satisfies the speed threshold, whether the vehicle driving mode is a performance mode, whether the parking brake lever position satisfies the activation position threshold, and/or whether the parking brake lever position satisfies the release position threshold, the PEPB controller 140 of FIGS. 1 and 2 determines one or more braking control signal(s) to be provided to the HCU 106 and/or the rear wheel brake caliper electric motors 128 of FIGS. 1 and 2.

For example, the PEPB controller 140 of FIGS. 1 and 2 may associate the determinations made by the PEPB controller 140 as to whether the vehicle speed satisfies the speed threshold, whether the vehicle driving mode is a performance mode, and whether the parking brake lever position satisfies the activation position threshold with a braking control signal to be provided to the HCU 106 and/or the rear wheel brake caliper electric motors 128 based on an activation position correlation table, list and/or matrix. The activation position correlation table, list and/or matrix utilized by the PEPB controller 140 may be of any format and may include any number of factors and/or fields. The activation position correlation table, list and/or matrix may be stored in a computer-readable storage medium storing electronically readable data accessible to the PEPB controller 140 such as the PEPB memory 142 described below.

FIG. 4 illustrates an example activation position correlation table 404 utilized by the example PEPB controller 140 of FIGS. 1 and 2. In the illustrated example of FIG. 4, the activation position correlation table 404 associates and/or identifies respective activation positions of the parking brake lever 114 satisfying the activation position threshold with braking control signals to be provided to the HCU 106 and/or the rear wheel brake caliper electric motors 128 based on whether the vehicle speed satisfies the speed threshold and based on whether the vehicle driving mode is a performance mode.

For example, the PEPB controller 140 may determine that the position of the parking brake lever 114 corresponds to the second example position 304 (e.g., thirty degrees (30°)) of FIG. 3, that the vehicle speed is zero miles per hour (0 mph), which fails to satisfy a one mile per hour (1 mph) speed threshold), and that the vehicle driving mode is a performance mode (e.g., a sport mode). The activation position correlation table 404 of FIG. 4 associates and/or identifies such determinations with a brake control signal to be provided to the rear wheel brake caliper electric motors 128 corresponding to an application of one hundred percent (100%) of a maximum clamping force to the rear wheel brake calipers 126. In this example, the PEPB controller 140, based on the activation position correlation table 404, provides a braking control signal to the rear wheel brake caliper electric motors 128 to cause the rear wheel brake caliper electric motors 128 to apply one hundred percent (100%) of the maximum clamping force to the rear wheel brake calipers 126. In scenarios where the vehicle speed fails to satisfy the speed threshold and the parking brake lever position satisfies the activation position threshold, the activation position correlation table 404 of FIG. 4 provides for the same percentage (e.g., one hundred percent (100%)) of the maximum clamping force to be applied to the rear wheel brake calipers 126 via the rear wheel brake caliper electric motors 128 regardless of the specific activation position of the parking brake lever 114.

As another example, the PEPB controller 140 may determine that the position of the parking brake lever 114 corresponds to the second example position 304 (e.g., thirty degrees (30°)) of FIG. 3, that the vehicle speed is thirty miles per hour (30 mph), which satisfies a one mile per hour (1 mph) speed threshold), and that the vehicle driving mode is a non-performance mode (e.g., a normal mode). The activation position correlation table 404 of FIG. 4 associates and/or identifies such determinations with a brake control signal to be provided to the HCU 106 corresponding to an application and/or supply of seventy percent (70%) of a maximum hydraulic pressure to the front wheel brake calipers 122 and the rear wheel brake calipers 126. In this example, the PEPB controller 140, based on the activation position correlation table 404, provides a braking control signal to the HCU 106 to cause the HCU 106 to apply and/or supply seventy percent (70%) of a maximum hydraulic pressure to the front wheel brake calipers 122 and the rear wheel brake calipers 126. In scenarios where the vehicle speed satisfies the speed threshold, the driving mode is a non-performance mode, and the parking brake lever position satisfies the activation position threshold, the activation position correlation table 404 of FIG. 4 provides for the same percentage (e.g., seventy percent (70%)) of the maximum hydraulic pressure to be applied and/or supplied to the front wheel brake calipers 122 and the rear wheel brake calipers 126 via the HCU 106 regardless of the specific activation position of the parking brake lever 114.

In other examples involving scenarios where the vehicle speed satisfies the speed threshold, the driving mode is a non-performance mode, and the parking brake lever position satisfies the activation position threshold, the activation position correlation table, list and/or matrix may provide for varying percentages of the maximum hydraulic pressure to be applied and/or supplied to the front wheel brake calipers 122 and the rear wheel brake calipers 126 via the HCU 106 based on the specific activation position of the parking brake lever 114. In other examples involving scenarios where the vehicle speed satisfies the speed threshold, the driving mode is a non-performance mode, and the parking brake lever position satisfies the activation position threshold, the activation position correlation table, list and/or matrix may provide for varying percentages of the maximum hydraulic pressure to be applied and/or supplied to the front wheel brake calipers 122 and the rear wheel brake calipers 126 via the HCU 106 based on the specific speed of the vehicle. Thus, the specific data values and/or data trends shown in the example activation position correlation table 404 of FIG. 4 are merely exemplary.

As another example, the PEPB controller 140 may determine that the position of the parking brake lever 114 corresponds to the second example position 304 (e.g., thirty degrees (30°)) of FIG. 3, that the vehicle speed is thirty miles per hour (30 mph), which satisfies a one mile per hour (1 mph) speed threshold), and that the vehicle driving mode is a performance mode (e.g., a sport mode). The activation position correlation table 404 of FIG. 4 associates and/or identifies such determinations with a brake control signal to be provided to the HCU 106 corresponding to an application and/or supply of fifteen percent (15%) of a maximum hydraulic pressure to the rear wheel brake calipers 126 only. In this example, the PEPB controller 140, based on the activation position correlation table 404, provides a braking control signal to the HCU 106 to cause the HCU 106 to apply and/or supply fifteen percent (15%) of a maximum hydraulic pressure to the rear wheel brake calipers 126. In scenarios where the vehicle speed satisfies the speed threshold, the driving mode is a performance mode, and the parking brake lever position satisfies the activation position threshold, the activation position correlation table 404 of FIG. 4 provides for varying percentages of the maximum hydraulic pressure to be applied and/or supplied to the rear wheel brake calipers 126 via the HCU 106 based on the specific activation position of the parking brake lever 114. For example, in such scenarios, the activation position correlation table 404 provides for fifteen percent (15%) of the maximum hydraulic pressure to be applied and/or supplied to the rear wheel brake calipers 126 when the activation position of the parking brake lever is thirty degrees (30°), and provides for seventy percent (70%) of the maximum hydraulic pressure to be applied and/or supplied to the rear wheel brake calipers 126 when the activation position of the parking brake lever is sixty degrees (60°). Thus, in such scenarios, the hydraulic pressure to be applied and/or supplied to the rear wheel brake calipers 126 is variable based on (e.g., proportional to) the specific activation position of the parking brake lever 114. As mentioned above, the specific data values and/or data trends shown in the example activation position correlation table 404 of FIG. 4 are merely exemplary.

Returning to the examples of FIGS. 1 and 2, the PEPB controller 140 of FIGS. 1 and 2 also associates the determination made by the PEPB controller 140 as to whether the parking brake lever position satisfies the release position threshold with a braking control signal to be provided to the rear wheel brake caliper electric motors 128 based on a release position correlation table, list and/or matrix. The release position correlation table, list and/or matrix utilized by the PEPB controller 140 may be of any format and may include any number of factors and/or fields. The release position correlation table, list and/or matrix may be stored in a computer-readable storage medium storing electronically readable data accessible to the PEPB controller 140 such as the PEPB memory 142 described below.

FIG. 4 illustrates an example release position correlation table 406 utilized by the example PEPB controller 140 of FIGS. 1 and 2. In the illustrated example of FIG. 4, the release position correlation table 406 associates and/or identifies respective release positions of the parking brake lever 114 satisfying the release position threshold with braking control signals to be provided to the rear wheel brake caliper electric motors 128. For example, the PEPB controller 140 may determine that the position of the parking brake lever 114 corresponds to the fourth example position 308 (e.g., zero degrees (0°)) of FIG. 3. The release position correlation table 406 of FIG. 4 associates and/or identifies such a determination with a brake control signal to be provided to the rear wheel brake caliper electric motors 128 corresponding to an application of zero percent (0%) of a maximum clamping force to the rear wheel brake calipers 126. In this example, the PEPB controller 140, based on the release position correlation table 406, provides a braking control signal to the rear wheel brake caliper electric motors 128 to cause the rear wheel brake caliper electric motors 128 to apply zero percent (0%) of the maximum clamping force to the rear wheel brake calipers 126 (e.g., to release the rear wheel brake calipers). In scenarios where the parking brake lever position satisfies the release position threshold, the release position correlation table 406 of FIG. 4 provides for the same percentage (e.g., zero percent (0%)) of the maximum clamping force to be applied to the rear wheel brake calipers 126 via the rear wheel brake caliper electric motors 128 regardless of the specific release position of the parking brake lever 114. The specific data values and/or data trends shown in the example release position correlation table 406 of FIG. 4 are merely exemplary.

Returning to the examples of FIGS. 1 and 2, the PEPB controller 140 of FIGS. 1 and 2 determines whether drive off conditions for the vehicle 200 of FIG. 2 have been detected. For example, the PEPB controller 140 may determine that drive off conditions (e.g., ignition of vehicle 200 turned on, brake pedal of vehicle 200 depressed, transmission of vehicle 200 in drive, etc.) have been detected by one or more sensor(s) (not shown) and/or electric control module(s) (not shown) of the vehicle 200 of FIG. 2 in communication with the PEPB controller 140 and/or the PEPB control module 116. In some examples, the PEPB controller 140 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2 in response to determining that drive off conditions for the vehicle 200 have been detected.

The PEPB memory 142 of FIGS. 1 and 2 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the PEPB memory 142 may be stored in any file and/or data structure format, organization scheme, and/or arrangement.

Data and/or information received by the PEPB controller 140, and/or, more generally, by the PEPB control module 116 from any of the speed sensor 110, the driving mode sensor 112, the user interface 118, and/or the position sensor 138 may be stored in the PEPB memory 142. Data and/or information corresponding to any of the speed threshold, the driving mode correlation table, list and/or matrix, the activation position threshold, the release position threshold, the activation position correlation table, list and/or matrix, and/or the release position correlation table, list and/or matrix may also be stored in the PEPB memory 142. Data and/or information stored in the PEPB memory 142 is accessible to the PEPB controller 140 of FIGS. 1 and 2, and/or, more generally, to the PEPB control module 116 of FIGS. 1 and 2.

The example user interface 118 of FIGS. 1 and 2 facilitates interactions and/or communications between a user (e.g., a driver) of a vehicle (e.g., the vehicle 200 of FIG. 2) and the PEPB controller 140, and/or, more generally, the PEPB control module 116. Data and/or information that is presented and/or received via the user interface 118 may be of any type, form and/or format, and may be stored in a computer-readable storage medium such as the example PEPB memory 142 of the PEPB control module 116 described above.

The user interface 118 of FIGS. 1 and 2 includes one or more input device(s) 144 via which the user may input information and/or data to the PEPB controller 140, and/or more generally, to the PEPB control module 116. For example, the user interface 118 may include a button, a microphone, and/or a touchscreen that enable(s) the user to convey data and/or commands to the PEPB controller 140, and/or, more generally, to the PEPB control module 116. In the illustrated example of FIG. 2, the input device 144 of the user interface 118 is implemented as an example driving mode selection button 204 positioned on an example steering wheel 206 of the vehicle 200.

The user interface 118 of FIGS. 1 and 2 also includes one or more output device(s) 146 via which the PEPB controller 140, and/or, more generally, the PEPB control module 116 presents information and/or data in visual and/or audible form to the user of the vehicle. For example, the user interface 118 may include a light emitting diode, a touchscreen, and/or a liquid crystal display for presenting visual information, and/or a speaker for presenting audible information. In the illustrated example of FIG. 2, the output device 146 of the user interface 118 is implemented as an example instrument panel 208 that is viewable by the user of the vehicle 200. The instrument panel 208 includes information and/or data indicating an example speed 210 of the vehicle 200, an example driving mode 212 of the vehicle 200, and an example degree and/or extent of braking force 214 applied by the PEPB system 100 of the vehicle 200.

While example manners of implementing the example PEPB system 100 are illustrated in FIGS. 1 and 2, one or more of the elements, processes and/or devices illustrated in FIGS. 1 and 2 may be combined, divided, re-arranged, omitted, eliminated and/or implemented in any other way. Further, the example speed sensor 110, the example driving mode sensor 112, the example user interface 118, the example HCU controller 130, the example HCU memory 132, the example position sensor 138, the example PEPB controller 140 and/or the example PEPB memory 142 of FIGS. 1 and 2 may be implemented by hardware, software, firmware and/or any combination of hardware, software and/or firmware. Thus, for example, any of the example speed sensor 110, the example driving mode sensor 112, the example user interface 118, the example HCU controller 130, the example HCU memory 132, the example position sensor 138, the example PEPB controller 140 and/or the example PEPB memory 142 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example speed sensor 110, the example driving mode sensor 112, the example user interface 118, the example HCU controller 130, the example HCU memory 132, the example position sensor 138, the example PEPB controller 140 and/or the example PEPB memory 142 is/are hereby expressly defined to include a tangible computer readable storage device or storage disk such as a memory, a digital versatile disk (DVD), a compact disk (CD), a Blu-ray disk, etc. storing the software and/or firmware. Further still, the example PEPB system 100 of FIGS. 1 and 2 may include one or more elements, processes and/or devices in addition to, or instead of, those illustrated in FIGS. 1 and 2, and/or may include more than one of any or all of the illustrated elements, processes and devices.

Figure 5A:
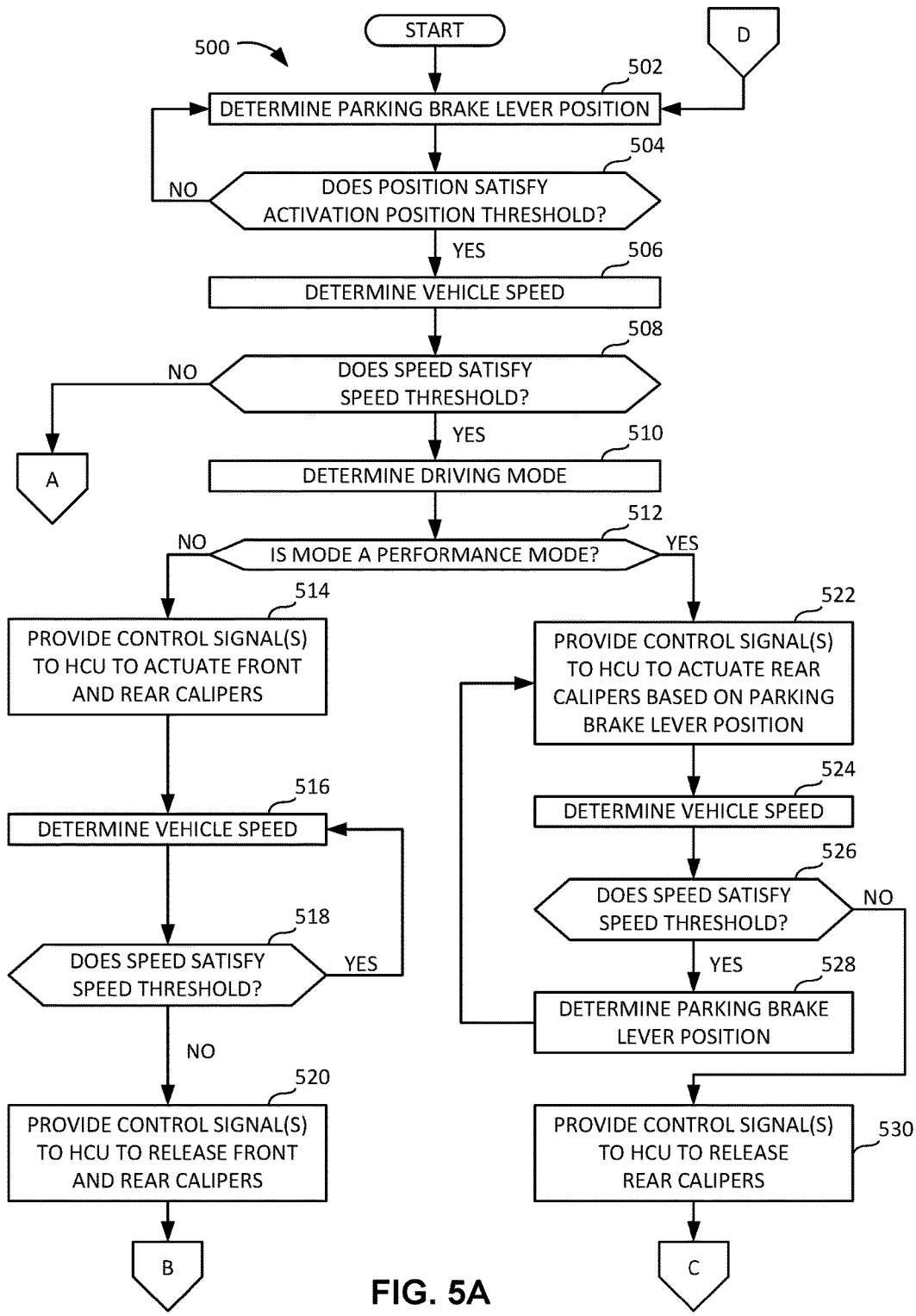
FIGS. 5A and 5B are a flowchart representative of an example method that may be executed at the example PEPB controller of FIGS. 1 and 2 to provide braking control signals to the example PEPB system of FIGS. 1 and 2 and/or the example vehicle of FIG. 2.
Figure 5B:
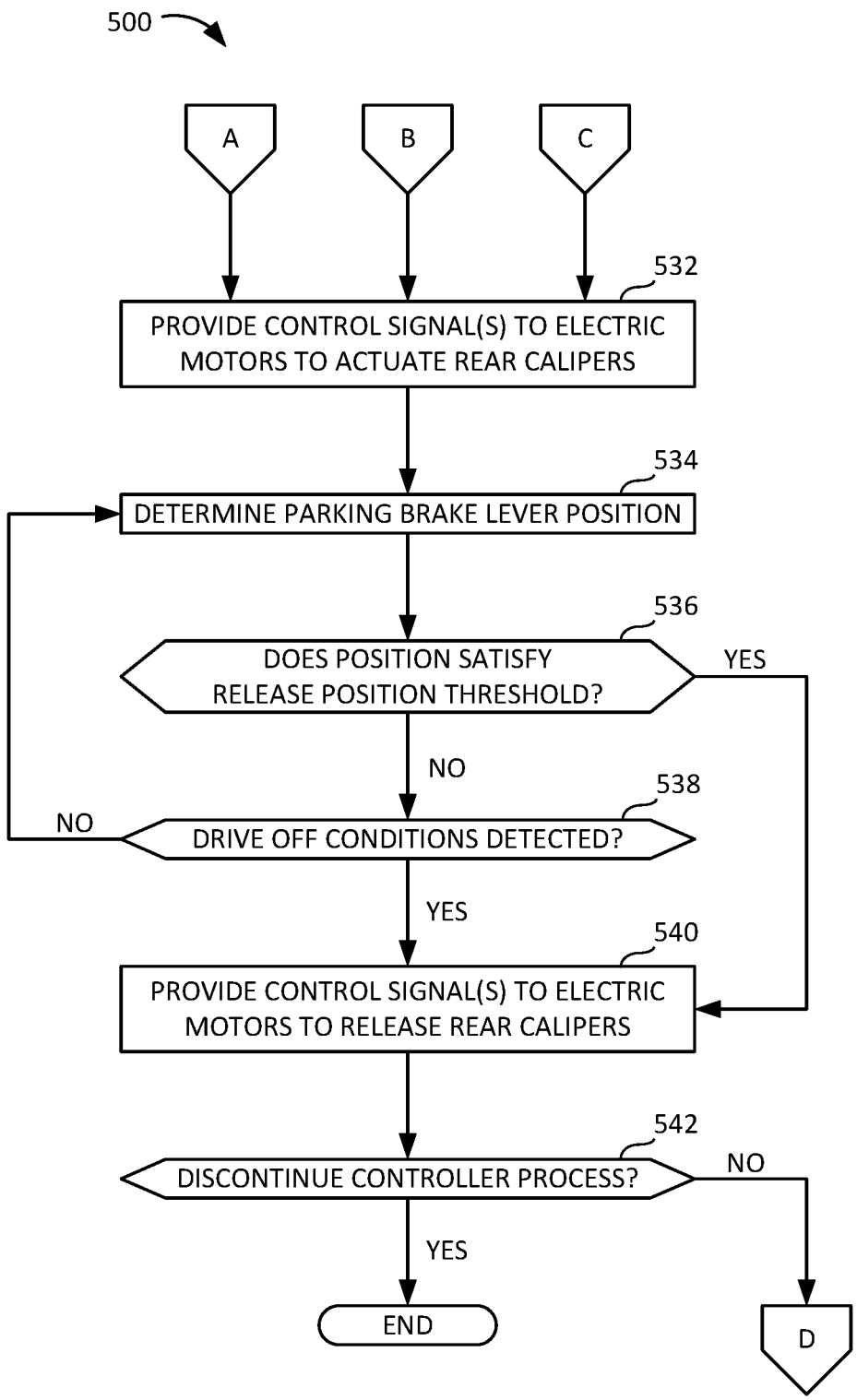

A flowchart representative of an example method for providing braking control signals from the example PEPB controller 140 of FIGS. 1 and 2 to the example PEPB system 100 of FIGS. 1 and 2 and/or the example vehicle 200 of FIG. 2 is shown in FIGS. 5A and 5B. In this example, the method may be implemented using machine-readable instructions that comprise one or more program(s) for execution by a controller or processor such as the example PEPB controller 140 of FIGS. 1 and 2 described above and shown in the example processor platform 600 discussed below in connection with FIG. 6. The one or more program(s) may be embodied in software stored on a tangible computer readable storage medium such as a CD-ROM, a floppy disk, a hard drive, a digital versatile disk (DVD), a Blu-ray disk, or a memory associated with the PEPB controller 140, but the entire program(s) and/or parts thereof could alternatively be executed by a device other than the PEPB controller 140 and/or embodied in firmware or dedicated hardware. Further, although the example program(s) is/are described with reference to the flowchart illustrated in FIGS. 5A and 5B, many other methods for providing braking control signals from the example PEPB controller 140 of FIGS. 1 and 2 to the example PEPB system 100 of FIGS. 1 and 2 and/or the example vehicle 200 of FIG. 2 may alternatively be used. For example, the order of execution of the blocks may be changed, and/or some of the blocks described may be changed, eliminated, or combined.

As mentioned above, the example method of FIGS. 5A and 5B may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIGS. 5A and 5B may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 5A and 5B are a flowchart representative of an example method 500 that may be executed at the example PEPB controller 140 of FIGS. 1 and 2 to provide braking control signals to the example PEPB system 100 of FIGS. 1 and 2 and/or the example vehicle 200 of FIG. 2. The example method 500 of FIGS. 5A and 5B begins when the PEPB controller 140 of FIGS. 1 and 2 determines a position of the parking brake lever 114 of FIGS. 1-3 (block 502). For example, the PEPB controller 140 may determine at block 502, based on data and/or information sensed, measured and/or detected by the position sensor 138 of FIGS. 1-3, that the parking brake lever 114 is in a position corresponding to the second example position 304 (e.g., thirty degrees (30°)) illustrated in FIG. 3.

The PEPB controller 140 of FIGS. 1 and 2 determines whether the position of the parking brake lever 114 determined at block 502 satisfies (e.g., exceeds) an activation position threshold (block 504). For example, the PEPB controller 140 may determine at block 504 that the second example position 304 (e.g., thirty degrees (30°)) of the parking brake lever 114 determined at block 502 satisfies the activation position threshold 316 (e.g., twenty degrees (20°) or greater) illustrated in FIG. 3. If the PEPB controller 140 determines at block 504 that the position of the parking brake lever 114 determined at block 502 does not satisfy the activation position threshold 316, control of the example method 500 returns to block 502. If the PEPB controller 140 instead determines at block 504 that the position of the parking brake lever 114 determined at block 502 satisfies the activation position threshold 316, control of the example method 500 proceeds to block 506.

At block 506, the PEPB controller 140 of FIGS. 1 and 2 determines a speed of the vehicle 200 of FIG. 2 (block 506). For example, the PEPB controller 140 may determine at block 506 that the speed of the vehicle 200 is thirty miles per hour (30 mph) based on data and/or information sensed, measured and/or detected by the speed sensor 110 FIGS. 1 and 2.

The PEPB controller 140 of FIGS. 1 and 2 determines whether the speed of the vehicle 200 determined at block 506 satisfies (e.g., exceeds) a speed threshold (block 508). For example, the PEPB controller 140 may determine that the example vehicle speed of thirty miles per hour (30 mph) described above in connection with block 506 satisfies an example speed threshold of one mile per hour (1 mph) and above. If the PEPB controller 140 determines at block 508 that the speed of the vehicle 200 determined at block 506 satisfies the speed threshold, control of the example method 500 proceeds to block 510. If the PEPB controller 140 instead determines at block 508 that the speed of the vehicle 200 determined at block 506 does not satisfy the speed threshold, control of the example method 500 proceeds to block 532.

At block 510, the PEPB controller 140 of FIGS. 1 and 2 determines a driving mode of the vehicle 200 of FIG. 2 (block 510). For example, the PEPB controller 140 may determine at block 510 that the driving mode of the vehicle 200 is a sport mode based on data and/or information sensed, measured and/or detected by the driving mode sensor 112 and/or the user interface 118 of FIGS. 1 and 2.

The PEPB controller 140 of FIGS. 1 and 2 determines whether the driving mode of the vehicle 200 determined at block 510 is a performance mode (block 512). For example, the PEPB controller 140 may determine at block 512 that the example sport mode of the vehicle 200 described above in connection with block 510 is a performance driving mode based on a driving mode correlation table, list and/or matrix (e.g., the driving mode correlation table 402 of FIG. 4). If the PEPB controller 140 determines at block 512 that the driving mode of the vehicle 200 determined at block 510 is not a performance mode, control of the example method 500 proceeds to block 514. If the PEPB controller 140 instead determines at block 512 that the driving mode of the vehicle 200 determined at block 510 is a performance mode, control of the example method 500 proceeds to block 522.

At block 514, the PEPB controller 140 of FIGS. 1 and 2 provides one or more control signal(s) to the HCU 106 of FIGS. 1 and 2 to cause the HCU 106 to actuate the front wheel brake calipers 122 and the rear wheel brake calipers 126 of the PEPB system 100 of FIGS. 1 and 2 and/or the vehicle 200 of FIG. 2 (block 514). For example, the PEPB controller 140 may provide one or more control signal(s) to the HCU 106 that cause the HCU 106 to provide a first hydraulic pressure (e.g., to apply seventy percent (70%) of the maximum hydraulic pressure) to the front wheel brake calipers 122 and the rear wheel brake calipers 126 of the vehicle 200 based on an activation position correlation table, list and/or matrix (e.g., the activation position correlation table 404 of FIG. 4).

Following block 514, the PEPB controller 140 of FIGS. 1 and 2 determines a speed of the vehicle 200 of FIG. 2 (block 516). For example, the PEPB controller 140 may determine at block 516 that the speed of the vehicle 200 is zero miles per hour (0 mph) based on data and/or information sensed, measured and/or detected by the speed sensor 110 of FIGS. 1 and 2.

The PEPB controller 140 of FIGS. 1 and 2 determines whether the speed of the vehicle 200 determined at block 516 satisfies (e.g., exceeds) a speed threshold (block 518). For example, the PEPB controller 140 may determine that the example vehicle speed of zero miles per hour (0 mph) described above in connection with block 516 does not satisfy the example speed threshold of one mile per hour (1 mph) and above. If the PEPB controller 140 determines at block 518 that the speed of the vehicle 200 determined at block 516 satisfies the speed threshold, control of the example method 500 returns to block 516. If the PEPB controller 140 instead determines at block 518 that the speed of the vehicle 200 determined at block 516 does not satisfy the speed threshold, control of the example method 500 proceeds to block 520.

At block 520, the PEPB controller 140 of FIGS. 1 and 2 provides one or more control signal(s) to the HCU 106 of FIGS. 1 and 2 to cause the HCU 106 to release the front wheel brake calipers 122 and the rear wheel brake calipers 126 of the PEPB system 100 of FIGS. 1 and 2 and/or the vehicle 200 of FIG. 2 (block 520). For example, the PEPB controller 140 may provide one or more control signal(s) to the HCU 106 that cause the HCU 106 to release the first hydraulic pressure (e.g., to apply zero percent (0%) of the maximum hydraulic pressure) from the front wheel brake calipers 122 and the rear wheel brake calipers 126. Following block 520, control of the example method 500 proceeds to block 532.

At block 522, the PEPB controller 140 of FIGS. 1 and 2 provides one or more control signal(s) to the HCU 106 of FIGS. 1 and 2 to cause the HCU 106 to actuate the rear wheel brake calipers 126 of the PEPB system 100 of FIGS. 1 and 2 and/or the vehicle 200 of FIG. 2 based on the position of the parking brake lever 114 determined at block 502 (block 522). For example, the PEPB controller 140 may provide one or more control signal(s) to the HCU 106 that cause the HCU 106 to provide a second hydraulic pressure (e.g., to apply fifteen percent (15%) of the maximum hydraulic pressure) to the rear wheel brake calipers 126, the second hydraulic pressure being a variable pressure determined by the PEPB controller 140 based on the position (e.g., thirty degrees (30°)) of the parking brake lever 114 and based on an activation position correlation table, list and/or matrix (e.g., the activation position correlation table 404 of FIG. 4).

Following block 522, the PEPB controller 140 of FIGS. 1 and 2 determines a speed of the vehicle 200 of FIG. 2 (block 524). For example, the PEPB controller 140 may determine at block 524 that the speed of the vehicle 200 is twenty miles per hour (20 mph) based on data and/or information sensed, measured and/or detected by the speed sensor 110 of FIGS. 1 and 2.

The PEPB controller 140 of FIGS. 1 and 2 determines whether the speed of the vehicle 200 determined at block 524 satisfies (e.g., exceeds) a speed threshold (block 526). For example, the PEPB controller 140 may determine that the example vehicle speed of twenty miles per hour (20 mph) described above in connection with block 524 satisfies the example speed threshold of one mile per hour (1 mph) and above. If the PEPB controller 140 determines at block 526 that the speed of the vehicle 200 determined at block 524 satisfies the speed threshold, control of the example method 500 proceeds to block 528. If the PEPB controller 140 instead determines at block 526 that the speed of the vehicle 200 determined at block 524 does not satisfy the speed threshold, control of the example method 500 proceeds to block 530.

At block 528, the PEPB controller 140 of FIGS. 1 and 2 determines a position of the parking brake lever 114 of FIGS. 1-3 (block 528). For example, the PEPB controller 140 may determine at block 528, based on data and/or information sensed, measured and/or detected by the position sensor 138 of FIGS. 1-3, that the parking brake lever 114 is in a position corresponding to the third example position 306 (e.g., sixty degrees (60°)) illustrated in FIG. 3. Following block 528, control of the example method 500 returns to block 522. Accordingly, the PEPB controller 140 will repeat the process of providing one or more control signal(s) to the HCU 106 to cause the HCU 106 to actuate the rear wheel brake calipers 126 of the PEPB system 100 of FIGS. 1 and 2 and/or the vehicle 200 of FIG. 2 based on the position(s) of the parking brake lever 114 determined at block 528 and based on the activation position correlation table, list and/or matrix (e.g., the activation position correlation table 404 of FIG. 4).

At block 530, the PEPB controller 140 of FIGS. 1 and 2 provides one or more control signal(s) to the HCU 106 of FIGS. 1 and 2 to cause the HCU 106 to release the rear wheel brake calipers 126 of the PEPB system 100 of FIGS. 1 and 2 and/or the vehicle 200 of FIG. 2 (block 530). For example, the PEPB controller 140 may provide one or more control signal(s) to the HCU 106 that cause the HCU 106 to release the second hydraulic pressure (e.g., to apply zero percent (0%) of the maximum hydraulic pressure) from the rear wheel brake calipers 126. Following block 530, control of the example method 500 proceeds to block 532.

At block 532, the PEPB controller 140 of FIGS. 1 and 2 provides one or more control signal(s) to the rear wheel brake caliper electric motors 128 of FIGS. 1 and 2 to cause the rear wheel brake caliper electric motors 128 to actuate the rear wheel brake calipers 126 of the PEPB system 100 of FIGS. 1 and 2 and/or the vehicle 200 of FIG. 2 (block 532). For example, the PEPB controller 140 may provide one or more control signal(s) to the rear wheel brake caliper electric motors 128 that cause the rear wheel brake caliper electric motors 128 to provide a clamping force (e.g., to apply one hundred percent (100%) of the maximum clamping force) to the rear wheel brake calipers 126 based on an activation position correlation table, list and/or matrix (e.g., the activation position correlation table 404 of FIG. 4).

Following block 532, the PEPB controller 140 of FIGS. 1 and 2 determines a position of the parking brake lever 114 of FIGS. 1-3 (block 534). For example, the PEPB controller 140 may determine at block 534, based on data and/or information sensed, measured and/or detected by the position sensor 138 of FIGS. 1-3, that the parking brake lever 114 is in a position corresponding to the fourth example position 308 (e.g., zero degrees (0°)) illustrated in FIG. 3.

The PEPB controller 140 of FIGS. 1 and 2 determines whether the position of the parking brake lever 114 determined at block 534 satisfies (e.g., is less than) a release position threshold (block 536). For example, the PEPB controller 140 may determine at block 536 that the fourth example position 308 (e.g. zero degrees (0°)) of the parking brake lever 114 determined at block 534 satisfies the release position threshold 318 (e.g., ten degrees (10°) or less) illustrated in FIG. 3. If the PEPB controller 140 determines at block 536 that the position of the parking brake lever 114 determined at block 534 does not satisfy the release position threshold 318, control of the example method 500 proceeds to block 538. If the PEPB controller 140 instead determines at block 536 that the position of the parking brake lever 114 determined at block 534 satisfies the release position threshold 318, control of the example method 500 proceeds to block 540.

At block 538, the PEPB controller 140 of FIGS. 1 and 2 determines whether drive off conditions have been detected (block 538). For example, the PEPB controller 140 may determine that drive off conditions (e.g., ignition of vehicle turned on, brake pedal of vehicle depressed, transmission of vehicle in drive, etc.) have been detected by one or more sensor(s) and/or electric control module(s) of the vehicle 200 of FIG. 2 in communication with the PEPB controller 140 and/or the PEPB control module 116. If the PEPB controller 140 determines at block 538 that drive off conditions have not been detected, control of the example method 500 returns to block 534. If the PEPB controller 140 instead determines at block 538 that drive off conditions have been detected, control of the example method 500 proceeds to block 540.

At block 540, the PEPB controller 140 of FIGS. 1 and 2 provides one or more control signal(s) to the rear wheel brake caliper electric motors 128 of FIGS. 1 and 2 to cause the rear wheel brake caliper electric motors 128 to release the rear wheel brake calipers 126 of the PEPB system 100 of FIGS. 1 and 2 and/or the vehicle 200 of FIG. 2 (block 540). For example, the PEPB controller 140 may provide one or more control signal(s) to the rear wheel brake caliper electric motors 128 that cause the rear wheel brake caliper electric motors 128 to release the clamping force (e.g., to apply zero percent (0%) of the maximum clamping force) from the rear wheel brake calipers 126 based on a release position correlation table, list and/or matrix (e.g., the release position correlation table 406 of FIG. 4).

Following block 540, the PEPB controller 140 of FIGS. 1 and 2 determines whether to discontinue the process by which the PEPB controller 140 manages and/or implements the PEPB system 100 of FIGS. 1 and 2 (block 542). For example, the PEPB controller 140 may obtain and/or receive data, information and/or signal(s) from one or more sensor(s) and/or electric control module(s) of the vehicle 200 of FIG. 2 indicating that the process by which the PEPB controller 140 manages and/or implements the PEPB system 100 of the vehicle 200 should be discontinued. If the PEPB controller 140 determines at block 542 that the process by which the PEPB controller 140 manages and/or implements the PEPB system 100 should not be discontinued, control of the example method 500 returns to block 502. If the PEPB controller 140 instead determines at block 542 that the process by which the PEPB controller 140 manages and/or implements the PEPB system 100 should be discontinued, the example method 500 ends.

Figure 6:
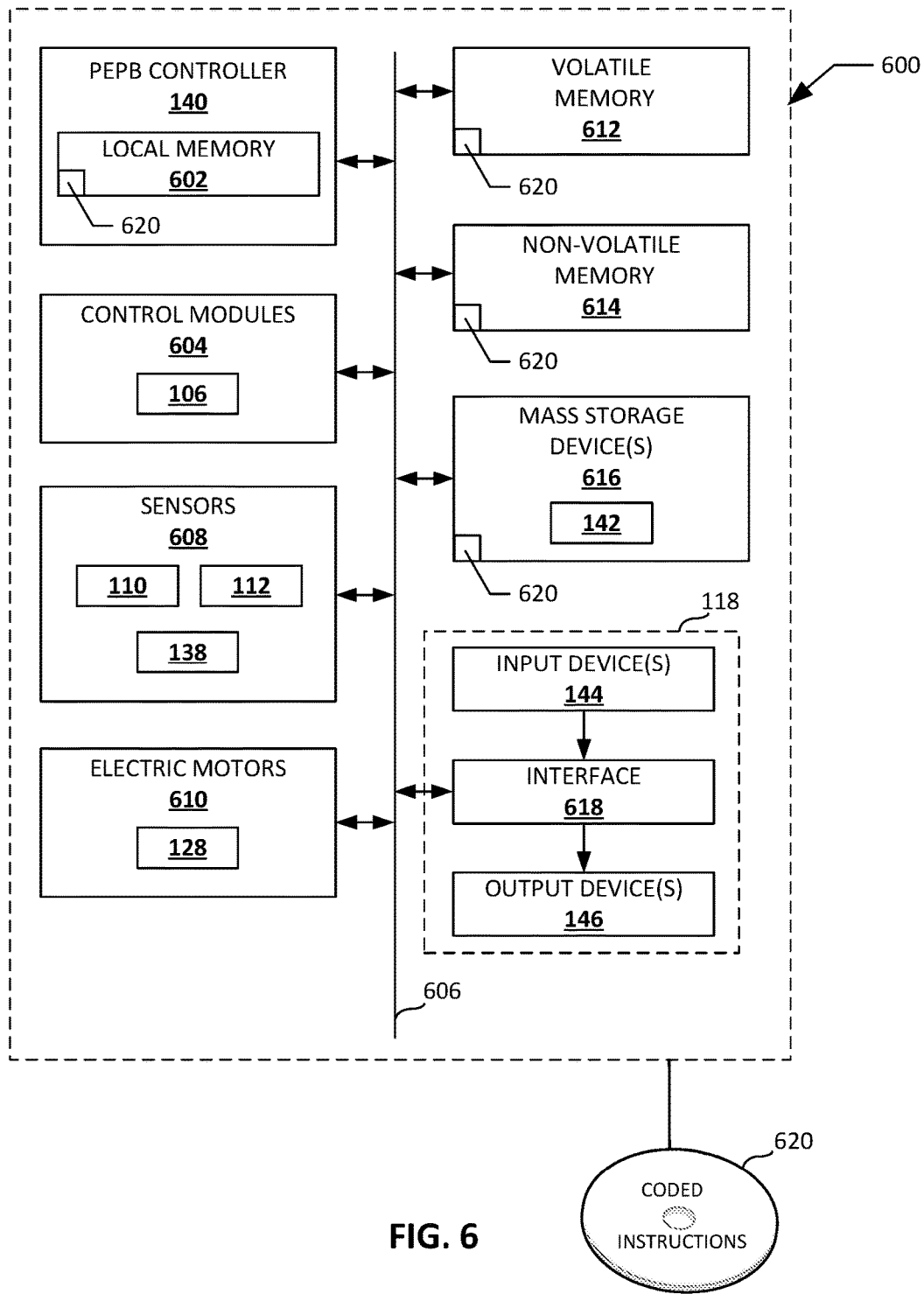
FIG. 6 is an example processor platform capable of executing instructions to implement the method of FIGS. 5A and 5B and the example PEPB system of FIGS. 1 and 2.

FIG. 6 is an example processor platform 600 capable of executing instructions to implement the method of FIGS. 5A and 5B and the example PEPB system 100 of FIGS. 1 and 2. The processor platform 600 of the illustrated example includes the PEPB controller 140. The PEPB controller 140 of the illustrated example is hardware. For example, the PEPB controller 140 can be implemented by one or more integrated circuits, logic circuits, microprocessors or controllers from any desired family or manufacturer. The PEPB controller 140 of the illustrated example includes a local memory 602 (e.g., a cache).

The PEPB controller 140 of the illustrated example is in communication with one or more example control module(s) 604 via a bus 606 (e.g., a controller area network (CAN) bus). The example control module(s) 604 include the example HCU 106 of FIGS. 1 and 2. The PEPB controller 140 of the illustrated example is also in communication with one or more example sensor(s) 608 via the bus 606. The example sensor(s) 608 include the example speed sensor 110, the example driving mode sensor 112 and the example position sensor 138 of FIGS. 1 and 2. The PEPB controller 140 of the illustrated example is also in communication with one or more electric motor(s) 610 via the bus 606. The example electric motor(s) 610 include the example rear wheel brake caliper electric motors 128 of FIGS. 1 and 2.

The PEPB controller 140 of the illustrated example is also in communication with a main memory including a volatile memory 612 and a non-volatile memory 614 via the bus 606. The volatile memory 612 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 614 may be implemented by flash memory and/or any other desired type of memory device. Access to the volatile memory 612 and the non-volatile memory 614 is controlled by a memory controller.

The PEPB controller 140 of the illustrated example is also in communication with one or more mass storage device(s) 616 for storing software and/or data. Example mass storage device(s) 616 include floppy disk drives, hard drive disks, compact disk drives, Blu-ray disk drives, RAID systems, and digital versatile disk (DVD) drives. In the illustrated example, the mass storage device 616 includes the example PEPB memory 142 of FIGS. 1 and 2.

The processor platform 600 of the illustrated example also includes an interface circuit 618. The interface circuit 618 may be implemented by any type of interface standard, such as an Ethernet interface, a universal serial bus (USB), and/or a PCI express interface. In the illustrated example, one or more input device(s) 144 are connected to the interface circuit 618. The input device(s) 144 permit(s) a user to enter data and commands into the PEPB controller 140. The input device(s) 144 can be implemented by, for example, an audio sensor, a camera (still or video), a keypad, a touchscreen, a track-pad, a trackball, isopoint, a voice recognition system, a button, a microphone, and/or a liquid crystal display. One or more output device(s) 146 are also connected to the interface circuit 618 of the illustrated example. The output device(s) 146 can be implemented, for example, by a light emitting diode, an organic light emitting diode, a liquid crystal display, a touchscreen and/or a speaker. The interface circuit 618 of the illustrated example may, thus, include a graphics driver such as a graphics driver chip and/or processor. In the illustrated example, the input device(s) 144, the output device(s) 146 and the interface circuit 618 collectively form the example user interface 118 of FIGS. 1 and 2.

Coded instructions 620 for implementing the method of FIGS. 5A and 5B may be stored in the local memory 602, in the volatile memory 612, in the non-volatile memory 614, in the mass storage device 616, and/or on a removable tangible computer readable storage medium such as a CD or DVD.

From the foregoing, it will be appreciated that the disclosed PEPB controllers and/or PEPB systems advantageously provide performance-based driving characteristics traditionally associated with mechanical parking brake systems. For example, the disclosed PEPB controllers and/or PEPB systems advantageously provide for a driver of a vehicle who selects a performance-based driving mode for the vehicle to control the application of variable braking forces to the rear wheels of the vehicle via a driver-positionable parking brake lever in communication with the PEPB controller of the PEPB system.

In some disclosed examples, an apparatus comprises a controller configured to electromechanically actuate rear brake calipers of a vehicle in response to a first set of operating conditions of the vehicle, to hydraulically actuate front brake calipers and the rear brake calipers of the vehicle in response to a second set of operating conditions of the vehicle, and to hydraulically actuate only the rear brake calipers in response to a third set of operating conditions of the vehicle. In some disclosed examples the first set of operating conditions includes a position of a parking brake lever of the vehicle satisfying a position threshold and a speed of the vehicle not satisfying a speed threshold. In some disclosed examples, the second set of operating conditions includes the position satisfying the position threshold, the speed satisfying the speed threshold and a driving mode of the vehicle being a non-performance mode. In some disclosed examples, the third set of operating conditions includes the position satisfying the position threshold, the speed satisfying the speed threshold and the driving mode being a performance mode. In some disclosed examples, the performance mode is one of a sport mode or a track mode, and the non-performance mode is one of a normal mode, a comfort mode, or an economy mode.

In some disclosed examples, the controller is configured to electromechanically actuate the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers. In some disclosed examples, the controller is configured to hydraulically actuate the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers. In some disclosed examples, the controller is configured to hydraulically actuate only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

In some disclosed examples, the controller is configured to provide a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers. In some disclosed examples, the controller is configured to provide a fifth control signal to the electric motors, the fifth control signal to cause the electric motors to provide the clamping force to the rear wheels of the vehicle via the rear brake calipers.

In some disclosed examples, the position of the parking brake lever is a first position of the parking brake lever, the position threshold is an activation position threshold, and the controller is configured to provide a sixth control signal to the electric motors in response to determining, following the first control signal, that the parking brake lever is in a second position that satisfies a release position threshold, the sixth control signal to cause the electric motors to release the clamping force from the rear wheels via the rear brake calipers. In some disclosed examples, the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

In some disclosed examples, a method for controlling an electric parking brake system of a vehicle comprises electromechanically actuating, by executing one or more instructions with a controller, rear brake calipers of the vehicle in response to a first set of operating conditions of the vehicle, hydraulically actuating, by executing one or more instructions with the controller, front brake calipers and the rear brake calipers of the vehicle in response to a second set of operating conditions of the vehicle, and hydraulically actuating, by executing one or more instructions with the controller, only the rear brake calipers in response to a third set of operating conditions of the vehicle. In some disclosed examples, the first set of operating conditions includes a position of a parking brake lever of the vehicle satisfying a position threshold and a speed of the vehicle not satisfying a speed threshold. In some disclosed examples, the second set of operating conditions includes the position satisfying the position threshold, the speed satisfying the speed threshold and a driving mode of the vehicle being a non-performance mode. In some disclosed examples, the third set of operating conditions includes the position satisfying the position threshold, the speed satisfying the speed threshold and the driving mode being a performance mode. In some disclosed examples, the performance mode is one of a sport mode or a track mode, and wherein the non-performance mode is one of a normal mode, a comfort mode, or an economy mode.

In some disclosed examples, the method includes electromechanically actuating the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers. In some disclosed examples, the method includes hydraulically actuating the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers. In some disclosed examples, the method includes hydraulically actuating only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

In some disclosed examples, the method further comprises providing, by executing one or more instructions with the controller, a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers. In some disclosed examples, the method further comprises providing, by executing one or more instructions with the controller, a fifth control signal to the electric motors, the fifth control signal to cause the electric motors to provide the clamping force to the rear wheels of the vehicle via the rear brake calipers.

In some disclosed examples, the position is a first position of the parking brake lever, the position threshold is an activation position threshold, and the method further comprises providing, by executing one or more instructions with the controller, a sixth control signal to the electric motors in response to determining, following the first control signal, that the parking brake lever is in a second position that satisfies a release position threshold, the sixth control signal to cause the electric motors to release the clamping force from the rear wheels via the rear brake calipers. In some disclosed examples, the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

In some disclosed examples, a tangible machine readable storage medium comprises instructions that, when executed, cause a controller to electromechanically actuate rear brake calipers of a vehicle in response to a first set of operating conditions of the vehicle, to hydraulically actuate front brake calipers and the rear brake calipers of the vehicle in response to a second set of operating conditions of the vehicle, and to hydraulically actuate only the rear brake calipers in response to a third set of operating conditions of the vehicle. In some disclosed examples the first set of operating conditions includes a position of a parking brake lever of the vehicle satisfying a position threshold and a speed of the vehicle not satisfying a speed threshold. In some disclosed examples, the second set of operating conditions includes the position satisfying the position threshold, the speed satisfying the speed threshold and a driving mode of the vehicle being a non-performance mode. In some disclosed examples, the third set of operating conditions includes the position satisfying the position threshold, the speed satisfying the speed threshold and the driving mode being a performance mode. In some disclosed examples, the performance mode is one of a sport mode or a track mode, and the non-performance mode is one of a normal mode, a comfort mode, or an economy mode.

In some disclosed examples, the instructions, when executed, cause the controller to electromechanically actuate the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers. In some disclosed examples, the instructions, when executed, cause the controller to hydraulically actuate the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers. In some disclosed examples, the instructions, when executed, cause the controller to hydraulically actuate only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

In some disclosed examples, the instructions, when executed, cause the controller to provide a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers. In some disclosed examples, the instructions, when executed, cause the controller to provide a fifth control signal to the electric motors, the fifth control signal to cause the electric motors to provide the clamping force to the rear wheels of the vehicle via the rear brake calipers.

In some disclosed examples, the position of the parking brake lever is a first position of the parking brake lever, the position threshold is an activation position threshold, and the instructions, when executed, cause the controller to provide a sixth control signal to the electric motors in response to determining, following the first control signal, that the parking brake lever is in a second position that satisfies a release position threshold, the sixth control signal to cause the electric motors to release the clamping force from the rear wheels via the rear brake calipers. In some disclosed examples, the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a controller configured to:
electromechanically actuate rear brake calipers of a vehicle in response to a first set of operating conditions of the vehicle;
hydraulically actuate front brake calipers and the rear brake calipers of the vehicle in response to a second set of operating conditions of the vehicle; and
hydraulically actuate only the rear brake calipers in response to a third set of operating conditions of the vehicle;
wherein the first set of operating conditions includes a position of a parking brake lever of the vehicle satisfying a position threshold and a speed of the vehicle not satisfying a speed threshold, wherein the second set of operating conditions includes the position satisfying the position threshold, the speed satisfying the speed threshold and a driving mode of the vehicle being a non-performance mode, and wherein the third set of operating conditions includes the position satisfying the position threshold, the speed satisfying the speed threshold and the driving mode being a performance mode.

2. The apparatus of claim 1, wherein the controller is configured to:
electromechanically actuate the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers;
hydraulically actuate the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers; and
hydraulically actuate only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

3. The apparatus of claim 2, wherein the controller is configured to:
provide a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers; and
provide a fifth control signal to the electric motors, the fifth control signal to cause the electric motors to provide the clamping force to the rear wheels of the vehicle via the rear brake calipers.

4. The apparatus of claim 3, wherein the position is a first position of the parking brake lever and the position threshold is an activation position threshold, and wherein the controller is configured to provide a sixth control signal to the electric motors in response to determining, following the first control signal, that the parking brake lever is in a second position that satisfies a release position threshold, the sixth control signal to cause the electric motors to release the clamping force from the rear wheels via the rear brake calipers.

5. The apparatus of claim 4, wherein the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

6. The apparatus of claim 1, wherein the performance mode is one of a sport mode or a track mode, and wherein the non-performance mode is one of a normal mode, a comfort mode, or an economy mode.

7. A method for controlling an electric parking brake system of a vehicle, the method comprising:
electromechanically actuating, by executing one or more instructions with a controller, rear brake calipers of the vehicle in response to a first set of operating conditions of the vehicle;

hydraulically actuating, by executing one or more instructions with the controller, front brake calipers and the rear brake calipers of the vehicle in response to a second set of operating conditions of the vehicle; and hydraulically actuating, by executing one or more instructions with the controller, only the rear brake calipers in response to a third set of operating conditions of the vehicle;

wherein the first set of operating conditions includes a position of a parking brake lever of the vehicle satisfying a position threshold and a speed of the vehicle not satisfying a speed threshold, wherein the second set of operating conditions includes the position satisfying the position threshold, the speed satisfying the speed threshold and a driving mode of the vehicle being a non-performance mode, and wherein the third set of operating conditions includes the position satisfying the position threshold, the speed satisfying the speed threshold and the driving mode being a performance mode.

8. The method of claim 7, wherein electromechanically actuating the rear brake calipers in response to the first set of operating conditions comprises providing a first control signal to electric motors operatively coupled to the rear brake calipers, the first control signal to cause the electric motors to provide a clamping force to rear wheels of the vehicle via the rear brake calipers, wherein hydraulically actuating the front and rear brake calipers in response to the second set of operating conditions comprises providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers, and wherein hydraulically actuating only the rear brake calipers in response to the third set of operating conditions comprises providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

9. The method of claim 8, further comprising:
providing, by executing one or more instructions with the controller, a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers; and
providing, by executing one or more instructions with the controller, a fifth control signal to the electric motors, the fifth control signal to cause the electric motors to provide the clamping force to the rear wheels of the vehicle via the rear brake calipers.

10. The method of claim 9, wherein the position is a first position of the parking brake lever and the position threshold is an activation position threshold, the method further comprising providing, by executing one or more instructions with the controller, a sixth control signal to the electric motors in response to determining, following the first control signal, that the parking brake lever is in a second position that satisfies a release position threshold, the sixth control signal to cause the electric motors to release the clamping force from the rear wheels via the rear brake calipers.

11. The method of claim 10, wherein the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

12. The method of claim 7, wherein the performance mode is one of a sport mode or a track mode, and wherein the non-performance mode is one of a normal mode, a comfort mode, or an economy mode.

13. A tangible machine readable storage medium comprising instructions that, when executed, cause a controller to at least:
electromechanically actuate rear brake calipers of a vehicle in response to a first set of operating conditions of the vehicle;
hydraulically actuate front brake calipers and the rear brake calipers of the vehicle in response to a second set of operating conditions of the vehicle; and
hydraulically actuate only the rear brake calipers in response to a third set of operating conditions of the vehicle;
wherein the first set of operating conditions includes a position of a parking brake lever of the vehicle satisfying a position threshold and a speed of the vehicle not satisfying a speed threshold, wherein the second set of operating conditions includes the position satisfying the position threshold, the speed satisfying the speed threshold and a driving mode of the vehicle being a non-performance mode, and wherein the third set of operating conditions includes the position satisfying the position threshold, the speed satisfying the speed threshold and the driving mode being a performance mode.

14. The tangible machine readable storage medium of claim 13, wherein the instructions, when executed, are further to cause the controller to:
electromechanically actuate the rear brake calipers in response to the first set of operating conditions by providing a first control signal to electric motors operatively coupled to the rear brake calipers, the first control signal to cause the electric motors to provide a clamping force to rear wheels of the vehicle via the rear brake calipers;
hydraulically actuate the front and rear brake calipers in response to the second set of operating conditions by providing a second control signal to a hydraulic control unit operatively coupled to the front and rear brake calipers, the second control signal to cause the hydraulic control unit to provide a first hydraulic pressure to front wheels of the vehicle and the rear wheels of the vehicle via the front and rear brake calipers; and
hydraulically actuate only the rear brake calipers in response to the third set of operating conditions by providing a third control signal to the hydraulic control unit, the third control signal to cause the hydraulic control unit to provide a second hydraulic pressure to the rear wheels via the rear brake calipers, the second hydraulic pressure being a variable pressure determined by the controller based on the position of the parking brake lever.

15. The tangible machine readable storage medium of claim 14, wherein the instructions, when executed, are further to cause the controller to:

provide a fourth control signal to the hydraulic control unit in response to determining that the second control signal has caused the vehicle to slow to a reduced speed that does not satisfy the speed threshold, the fourth control signal to cause the hydraulic control unit to release the first hydraulic pressure from the front and rear wheels of the vehicle via the front and rear brake calipers; and provide a fifth control signal to the electric motors, the fifth control signal to cause the electric motors to provide the clamping force to the rear wheels of the vehicle via the rear brake calipers.

16. The tangible machine readable storage medium of claim 15, wherein the position is a first position of the parking brake lever and the position threshold is an activation position threshold, and wherein the controller is configured to provide a sixth control signal to the electric motors in response to determining, following the first control signal, that the parking brake lever is in a second position that satisfies a release position threshold, the sixth control signal to cause the electric motors to release the clamping force from the rear wheels via the rear brake calipers.

17. The tangible machine readable storage medium of claim 16, wherein the parking brake lever is biased to a neutral position that does not satisfy the activation position threshold and does not satisfy the release position threshold, the parking brake lever being movable from the neutral position toward the activation position threshold in a first direction and movable from the neutral position toward the release position threshold in a second direction opposite the first direction.

18. The tangible machine readable storage medium of claim 13, wherein the performance mode is one of a sport mode or a track mode, and wherein the non-performance mode is one of a normal mode, a comfort mode, or an economy mode.

* * * * *